United States Patent [19]
Marshall et al.

[11] Patent Number: 6,121,760
[45] Date of Patent: Sep. 19, 2000

[54] TURN-ON CONTROLLER FOR SWITCH-MODE REGULATOR

[75] Inventors: Andrew Marshall; Joseph Devore, both of Dallas, Tex.

[73] Assignee: Texas Instruments Incorporated, Dallas, Tex.

[21] Appl. No.: 08/210,224

[22] Filed: Mar. 17, 1994

[51] Int. Cl.$^7$ ........................................................ G05F 1/56
[52] U.S. Cl. ............................................................. 323/282
[58] Field of Search .................................... 323/282, 283, 323/288, 289, 901; 363/49; 377/64, 75, 76

[56] References Cited

U.S. PATENT DOCUMENTS

| | | | |
|---|---|---|---|
| 4,325,021 | 4/1982 | McMackin | 323/288 |
| 4,553,082 | 11/1985 | Nesler | 323/282 |
| 5,079,498 | 1/1992 | Cleasby et al. | 323/283 |
| 5,233,508 | 8/1993 | Yamamura et al. | 323/282 |

OTHER PUBLICATIONS

"Unique Monolithic Power Switching Regulator Allows Simple and Efficient DC/DC Converter Design," J. H. Alberkrack and E. W. Tisinger, *PCIM (Power Conversion & Intelligent Motion,* Sep. 1990, pp. 53–58.

*Primary Examiner*—Matthew Nguyen
*Attorney, Agent, or Firm*—W. Daniel Swayze, Jr.; W. James Brady, III; Frederick J. Telecky, Jr.

[57] ABSTRACT

A switch-mode power regulator includes a turn-on controller 52 to limit, during a fixed period of time, the initial current passing through the regulator following turn-on. During this time period the storage elements of the regulator must achieve an acceptable level of stability without excessive current flow. Turn-on controller 52 comprises a divider 72 which clocks zeroes along the length of a shift register 74 which is initially preset to all ones. The outputs of the shift register are coupled to a decoder 76, whose input signals are sequentially steered to its output under the control of a counter 70. The output signal from decoder 76 functions as the power regulator switching signal from turn-on controller 52. Counter 70 cycles many times for each data shift of shift register 74. Thus, turn-on controller 52 generates a train of negative pulses which increase in length monotonically for the duration of the sequence. In one embodiment, the first two data inputs of decoder 76 are grounded, thereby providing a fixed minimum pulse width at the onset of the sequence. In another embodiment, the last two data inputs of decoder 76 are tied to logic supply voltage, thereby preventing cycle skipping.

14 Claims, 4 Drawing Sheets

TURN-ON CONTROLLER FOR SWITCH-MODE REGULATOR

TECHNICAL FIELD OF THE INVENTION

The present invention relates generally to power supply circuits and, more particularly, to a switch-mode power regulator including apparatus for providing a controlled turn-on.

BACKGROUND OF THE INVENTION

A buck-type power regulator includes an inductor-capacitor-diode network which is responsive to an unregulated dc input voltage for providing a fixed dc voltage at its output. A switch-mode power regulator includes circuitry which compares the output voltage of the regulator with a reference voltage, using the comparator error signal to appropriately switch the input supply of the regulator on and off. An illustrative method of effectuating the regulator switching is by comparing the error signal with a ramp signal which is periodic at a fixed frequency, switching the regulator on at the instant the increasing ramp exceeds the error signal, and holding the regulator on until the end of that ramp cycle. A switch-mode power regulator thereby generates an output voltage level which can be kept stable despite output load variations.

During start-up of a switch-mode power regulator, the output voltage begins at a low level, and gradually rises as the current increases through the inductor, causing the storage capacitor to charge. If no corrective action is provided, by the time the voltage reaches its normal operating level, the current through the drive transistor and inductor may reach an excessively high value, typically in the range of ten to one hundred times the normal operating value. This condition is unacceptable and can lead to damage to the switch-mode circuit and the inductor, as well as causing a serious overshoot of the voltage rail.

One method commonly used to limit the regulator input current during start-up is a cycle-by-cycle current control. This method controls the regulator input current by detecting a current through the drive transistor which exceeds a preselected threshold, and turning off the drive transistor for the remainder of that cycle. Input current to the regulator may also be limited using analog current limiting techniques. Analog limiting of the current is undesirable, as it leads to excessive dissipation in the drive transistor. Either method can be inaccurate, unless a precision current limit circuit is used. Such a circuit would require an extensive area on an integrated circuit die. Where the system is a hybrid circuit in which the drive transistor is separate from the control circuitry, such a current limiting circuit may require the inclusion of additional components.

In view of the above, it is clear that there exists a need to develop an improved apparatus for controlling the turn-on of a switch-mode power regulator than is currently known in the art.

SUMMARY OF THE INVENTION

In accordance with the principles of the present invention, there is disclosed herein an apparatus for use in a power regulator, wherein the apparatus provides a controlled turn-on of the power regulator. The apparatus comprises means responsive to an initiation of turn-on of the power regulator for generating a signal comprising a sequence of pulses, the pulses increasing in length monotonically during the sequence, the sequence of pulses being of a predetermined time duration. The apparatus further comprises means responsive to the signal for enabling current flow through the power regulator during of each of the pulses.

In accordance with a preferred embodiment of the present invention, the means for generating a signal comprising a sequence of pulses includes means for generating a first clocking signal and means for generating a second clocking signal having frequency less than the first clocking signal. The generating means also includes a shift register having a plurality of stages, the signals at the output terminals of all of the shift register stages being preset to a first voltage level in response to the initiation of turn on of the power regulator, the shift register configured to propagate a second voltage level signal therethrough on successive occurrences of the second clocking signal. The generating means further includes a binary counter responsive to the first clocking signal for providing binary-coded output signals representative of the count of the counter. Finally, the generating means includes a decoder having data input terminals coupled individually to the shift register output terminals, and having select input terminals coupled individually to the counter output signals, the decoder having an output terminal, wherein the signal at a selected one of the decoder data input terminals is coupled to the decoder output terminal in accordance with the signal levels at the select input terminals, the decoder providing at the decoder output terminal the signal comprising a sequence of pulses.

Further in accordance with the present invention there is disclosed a switch-mode power regulator having an input terminal for receiving current from a source and having an output terminal, the power regulator responsive to the voltage at the output terminal for controlling the current at the input terminal, the power regulator including apparatus for providing a controlled turn on of the power regulator. The apparatus comprises means responsive to an initiation of current from the source for generating a signal comprising a sequence of pulses, the pulses increasing in length monotonically during the sequence, the sequence being of a predetermined time duration. The apparatus further comprises means responsive to the signal for enabling current at the input terminal for the durations of each of the pulses.

BRIEF DESCRIPTION OF THE DRAWING

The foregoing features of the present invention may be more fully understood from the following detailed description, read in conjunction with the accompanying drawings, wherein.

DESCRIPTION OF THE PREFERRED EMBODIMENT

Figure 1:
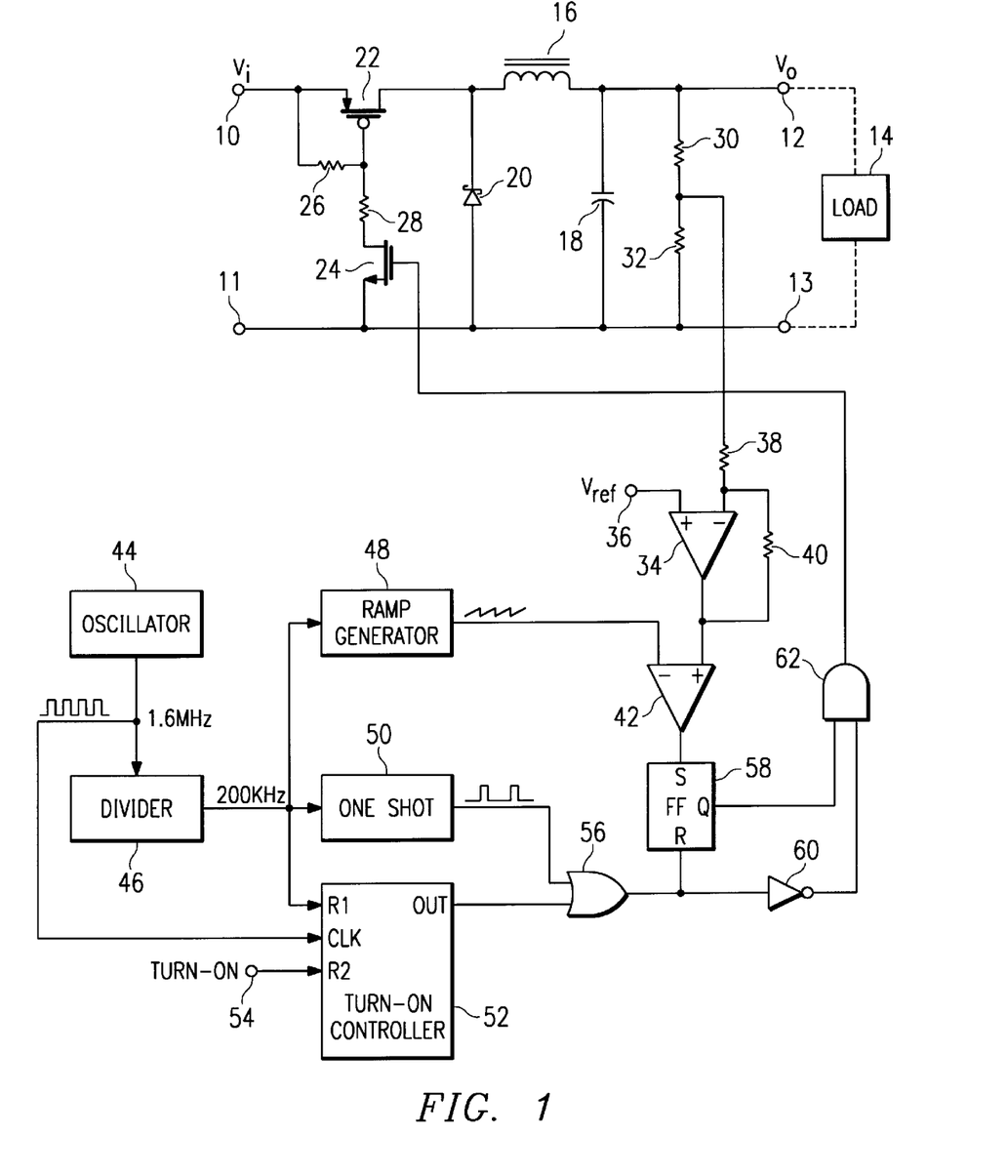
FIG. 1 illustrates a buck-type switch-mode power regulator including a turn-on controlling apparatus in accordance with the present invention.

Referring initially to FIG. 1, there is shown a buck-type switch-mode power regulator including a controlled turn-on apparatus in accordance with the present invention. The regulator includes a drive transistor 22, shown by way of illustration as a p-channel metal-oxide-semiconductor (PMOS) field effect transistor (FET), coupled to a series inductor 16, capacitor 18 and recirculation diode 20. FET 22 is controlled by a switching device 24, illustratively an n-channel metal-oxide-semiconductor (NMOS) FET. An input dc voltage, $V_i$ applied across input terminals 10,11, is processed by the aforementioned circuit so as to produce a regulated output voltage, $V_o$, applied across output terminals 12,13, which may be coupled to a load device 14. By way of example, inductor 16 may range from a value of 1 microhenry to 1 millihenry, capacitor 18 may be an electrolytic capacitor having a value of 500 microfarads, and diode 20 may be a Schottky type.

The output voltage is regulated by sensing the voltage across terminals 12,13 and causing switching FET 24 to either enable current or inhibit current flow through drive FET 22. The voltage across terminals 12,13 is measured using a voltage divider comprising resistors 30 and 32, both of which may have, by way of illustration, values of 1 KΩ. The measured voltage, at the junction of resistors 30 and 32, is applied via resistor 38 to the (−) input node of differential amplifier 34. The (+) input node of amplifier 34 is coupled to a reference voltage source, styled $V_{ref}$, which, for an intended regulator output voltage of 5 volts and for the component values given herein by way of example, may be 2.5 volts.

The output signal from amplifier 34 represents the error of the magnitude of the regulator output voltage from its desired value. Depending on the voltage rails of amplifier 34, its output signal will range from a relatively high voltage level when the voltage measured from the regulator output is greater than $V_{ref}$ to a relatively low voltage level when the voltage measured from the regulator output is less than $V_{ref}$. The gain of amplifier is determined by the relative values of series input resistor 38 and feedback resistor 40. In the present example, resistor 38 may be 50 KΩ and resistor 40 may be 500 KΩ, thereby producing a gain of ten for the error signal output from amplifier 34. The signal at the output node of amplifier 34 is applied to the (+) input node of comparator 42.

The signal applied to the (−) input node of comparator 42 is a periodic ramp signal derived from oscillator 44, divider 46 and ramp generator 48. In the present example, oscillator 44 generates a square wave output signal at a frequency of 1.6 MHz. Divider 46 is coupled at its input node to the output signal from oscillator 44, and, in the present example, divides the oscillator 44 signal frequency by eight to a frequency of 200 KHz. The 200 KHz output signal from divider 46 is applied to the input terminal of ramp generator 48 which generates a substantially linear upward-ramping waveform output signal for each cycle of the input signal, each ramp being initiated in response to a low-to-high transition of the input signal to ramp generator 48. The ramp waveform output signal is applied to the (−) input node of comparator 42 to be compared with the signal generated by amplifier 34.

Comparator 42 is coupled at its output node to the set (S) input terminal of R-S flip-flop 58. The signal at the output node of comparator 42 assumes a logic high level when the voltage of the ramp signal applied to its (−) input node exceeds the voltage of the error signal applied at its (+) input node, and it assumes a logic low level when the voltage of the ramp signal is less than the voltage of the error signal. Thus, when the voltage of the ramp signal exceeds the voltage of the error signal from amplifier 34, flip-flop 58 is caused to be set, and it remains in that state until the setting input signal switches to a logic low level and a logic high level signal is applied to its reset (R) input terminal. The signal at the Q output terminal of R-S flip-flop 58 is coupled to a first input terminal of AND gate 62. The output terminal of AND gate 62 is coupled to the gate electrode of NMOS FET 24. The arrangement of PMOS FET 22, NMOS FET 24 and resistors 26 and 28 is such that when the signal at the output terminal of AND gate 62 is at a high logic level (typically at five volts), switching FET 24 conducts, causing drive FET 22 to enable current flow into the power regulator. When the signal at the output terminal of AND gate 62 is at a low logic level (typically at zero volts), switching FET 24 is turned off, causing drive FET 22 to disable current flow from the power regulator. By way of illustration, resistors 28 and 28 may both have values of 10 KΩ.

The power regulator illustrated herein includes a feature for preventing cycle skipping, wherein current flow into the regulator is periodically blocked at a fixed duty cycle, regardless of the potential across the output terminals 12,13. This feature is implemented using one shot circuit 50, coupled to the 200 KHz output signal generated by divider 46. One shot circuit 50 generates a relatively short positive pulse in response to the low-to-high transition of its input signal. It may be seen that each pulse from one shot circuit 50 occurs substantially simultaneously with the onset of a ramp generated by ramp generator 48. The output signal from one shot circuit 50 is applied to a first input terminal of OR gate 56, whose output signal is coupled to the reset (R) input terminal of R-S flip-flop 58 and to the input terminal of inverter 60. The output signal from inverter 60 is coupled to the second input terminal of AND gate 62.

The above-described, illustrative switching control circuitry operates as follows: every five $\mu$seconds, at the positive-going transition of the 200 KHz signal from divider 46, one shot circuit 50 generates a short positive pulse which propagates through OR gate 56 and resets flip-flop 58. This pulse is inverted by inverter 60, applying a short logic low inhibiting pulse at an input of AND gate 62, thereby causing a logic low signal at the output of AND gate 62 which turns off switching FET 24. In the present example, the pulse generated by one shot circuit 50 has a duration of one-eighth of the period of the input signal, so that the feature for preventing cycle skipping causes drive FET 22 to be forced off for approximately 0.625 $\mu$seconds during each period of 5 $\mu$seconds.

The reset state of flip-flop 58 causes a logic low at its Q output terminal, applying an inhibit at the second input of AND gate 62 which is sustained even after the pulse at its other input terminal ends. If, during the upward excursion of the ramp signal generated by ramp generator 48, the ramp signal level exceeds the error signal generated by amplifier 34, the output signal from comparator 42 switches to a high logic level, setting R-S flip-flop 58, and causing the logic level at its Q output terminal to go high. Assuming that the negative pulse from inverter 60 is finished before the comparator 42 output signal switches to a high level, the output of AND gate 62 rises to a high logic level and switching FET 24 is turned on for the remainder of the five-$\mu$second period.

In accordance with the principles of the present invention, a turn-on controller 52 is added to the circuitry of the switch-mode power regulator of FIG. 1 to limit, during a fixed period of time following turn-on, the initial current passing through the regulator. During this time period the storage elements, viz., inductor 16 and capacitor 18, achieve an acceptable level of stability. Turn-on controller 52 is responsive to the high speed clock signal from oscillator 44, illustratively at 1.6 MHz, and to the clock signal from divider 46, illustratively at 200 KHz, to produce an output signal which is combined by OR gate 56 with the cycle skip preventing output signal from one shot circuit 50, to control the state of switching FET 24 and hence the conductive state of drive FET 22. The output signal from turn-on controller 52 thus controls the switch-mode power regulator during the start-up period, limiting the on-time of the power regulator during start-up and limiting the current rise in the inductor, while allowing a smooth rise in power regulator output voltage to the operating point. Turn-on controller 52 is additionally responsive to a TURN-ON signal applied at input terminal 54, which typically comprises a single pulse at the onset of application of input power across terminals 10,11 of the power regulator.

Figure 2:
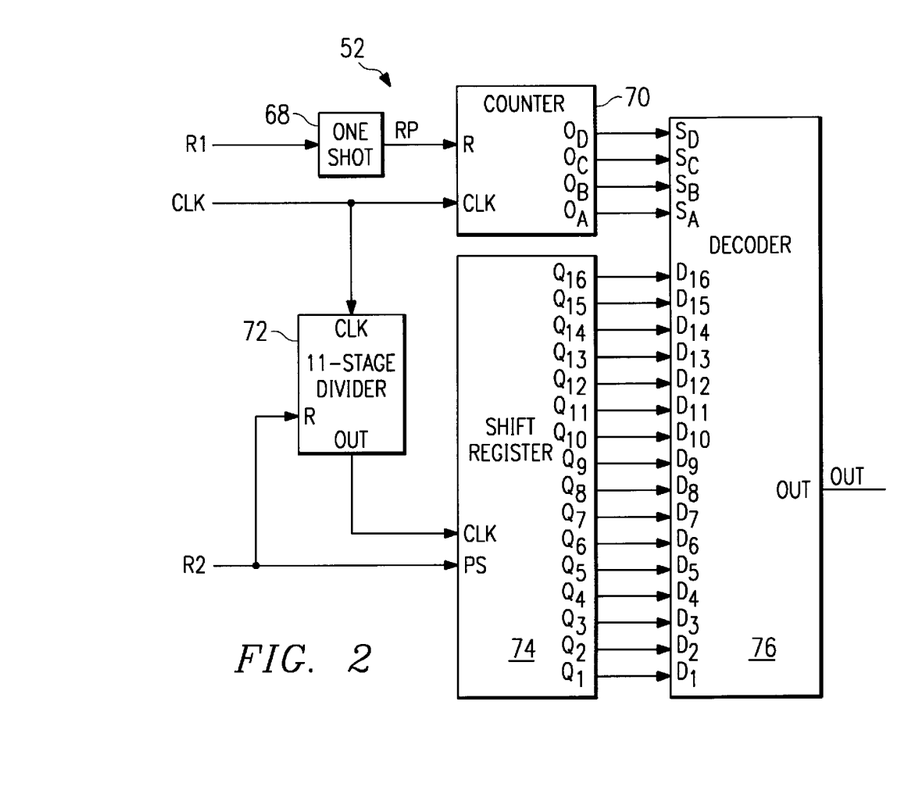
FIG. 2 illustrates in greater detail the turn-on controller of FIG. 1 according to a first embodiment.

Referring now to FIG. 2, there is shown in greater detail the turn-on controller 52 of FIG. 1. It will be noted that the signal interface to turn-on controller 52 of FIG. 1 is designated identically with that of controller 52 as shown in FIG. 2. In the present example, turn-on controller 52 comprises a one shot circuit 68, a binary counter 70, a divider circuit 72, a shift register 74 and a decoder 76.

One shot circuit 68, typically a monostable multivibrator, is coupled at its input terminal R1 to the 200 KHz square wave output from divider 46 (of FIG. 1) and generates at its output terminal a very short positive pulse, illustratively 300 nanoseconds in duration, at each positive-going transition of the divider 46 output signal.

The pulsed signal from one shot 68 is coupled to the reset (R) input of counter 70, causing the signal levels at its outputs, $O_A$, $O_B$, $O_C$ and $O_D$, to be reset to their logic low levels at each pulse occurrence. Counter 70 receives as its clocking (CLK) signal the 1.6 MHz output signal from oscillator 44 (of FIG. 1). Counter 70 is a binary counter which is configured such that the signal output at its $O_A$ terminal matches the frequency and phase of the input CLK signal, the signal output at its $O_B$ terminal is one-half the frequency of the $O_A$ output, the signal output at its $O_C$ terminal is one-quarter the frequency of the $O_A$ output, and the signal output at its $O_D$ terminal is one-eighth the frequency of the $O_A$ output. One exemplary implementation of this configuration includes a frequency doubler coupled to the CLK input terminal and a four-stage binary counter coupled to the frequency doubler output to provide the four outputs, $O_A$, $O_B$, $O_C$ and $O_D$. These four output signals, at terminals $O_A$, $O_B$, $O_C$ and $O_D$, are coupled, respectively, to select input terminals $S_A$, $S_B$, $S_C$ and $S_D$, of decoder 76.

Divider 72 comprises, in this illustrative embodiment, an eleven-stage divider which is clocked at its CLK input by the 1.6 MHz output signal from oscillator 44 (of FIG. 1), thereby generating at its output terminal (OUT) a square-wave signal having a period of approximately 1.28 milliseconds. Divider 72 is initially reset to an all-zeroes state by the application of a positive pulse at its reset (R) input terminal, which is accomplished by coupling the R2 signal of turn-on controller 52 to input terminal 54 (of FIG. 1), which pulse occurs at the onset of input power across terminals 10,11 of the power regulator. The square-wave output signal from divider 72 is coupled to the clocking (CLK) input terminal of shift register 74.

Shift register 74 comprises, in this embodiment, a sixteen-bit device all of whose storage elements are initially set to a high logic level (logic "1") by the application of the R2 signal coupled to its preset (PS) input terminal. The sixteen output signals from shift register 74, $Q_1$ through $Q_{16}$, are coupled, respectively, to the sixteen data inputs, $D_1$ through $D_{16}$, of decoder 76. Shift register 74 is configured such that the first negative-going transition of the output signal from divider 72 following the R2 signal clocks the logic state of each shift register storage element to the next higher storage element, i.e., from the stage associated with output $Q_i$ to the stage associated with output $Q_{i+1}$. It is further configured so that the logic level shifted into the first stage, associated with output $Q_1$, is a low logic level (logic "0").

Decoder 76 comprises, in this embodiment, a multiplexer in which the signal at any one of its sixteen data inputs, $D_1$ through $D_{16}$, can be steered to its output terminal (OUT) in accordance with a conventional binary addressing scheme from the logic levels at its respective select inputs $S_A$, $S_B$, $S_C$ and $S_D$. $S_A$ is the least significant addressing bit and $S_D$ is the most significant addressing bit of decoder 76.

Turn-on controller 52, as described in the present example, operates as follows: at the moment of initiation of power to the regulator (of FIG. 1), a short positive pulse on signal line R2 resets divider 72 to an all-zeroes state and presets shift register 74 to set each of its storage elements to a logic one level. Thus, regardless of the initial output states of the signals at $O_A$, $O_B$, $O_C$ and $O_D$ of counter 70, a logic one level will appear at the output terminal (OUT) of decoder 76. Counter 70 is reset to an all-zeroes count by the RP pulse from one shot circuit 68, and both counter 70 and divider 72 begin to be clocked by the CLK signal. Counter 70 cycles through its sixteen binary states in 10 $\mu$seconds (16×0.625 $\mu$seconds), and is then reset by the RP pulse and begins counting again. Since all of the storage elements of shift register contain logic ones, decoder 76 presents a constant output at a logic one level, and the output of turn-on controller 52 is a solid high logic level. When divider 72 reaches the count of 2,048 CLK pulses (in the present example), it causes shift register 74 to shift a logic zero level into its first storage element.

During the next segment, while divider 72 is counting 2,048 CLK pulses for the second time, each time that the counter 70 outputs select the signal on the D, input of decoder 76 to be steered to its OUT terminal, the output of turn-on controller 52 is at a low logic level; otherwise, the output of turn-on controller 52 is at a high logic level. Thus, during this segment the turn-on controller 52 output is a logic low level one-sixteenth of the time (0.625 $\mu$seconds during each period of 10 $\mu$seconds). When divider 72 reaches the count of 2,048, it causes a shift in the storage elements of shift register 74, resulting in logic zero levels in the first and second storage elements.

During next segment, while divider 72 is counting 2,048 CLK pulses for the third time, each time that the counter 70 outputs select the signal on the $D_1$ or $D_2$ inputs of decoder 76 to be steered to its OUT terminal, the output of turn-on controller 52 is at a low logic level; otherwise, the output of turn-on controller 52 is at a high logic level. Thus, during this period the turn-on controller 52 output is a logic low level two-sixteenths of the time (1.25 $\mu$seconds during each period of 10 $\mu$seconds).

It can been seen that as this sequence continues, the logic zero level output pulses of turn-on controller 52 increase monotonically until, during the seventeenth period, all of the storage elements of shift register 74 are set to logic zero levels, and the output of turn-on controller 52 is at a constant logic zero level. At this point, turn-on controller 52 no longer has an effect on the operation of switching FET 24 (of FIG. 1), and the operation of the power regulator reverts to its conventional means of output voltage control.

Figure 3:
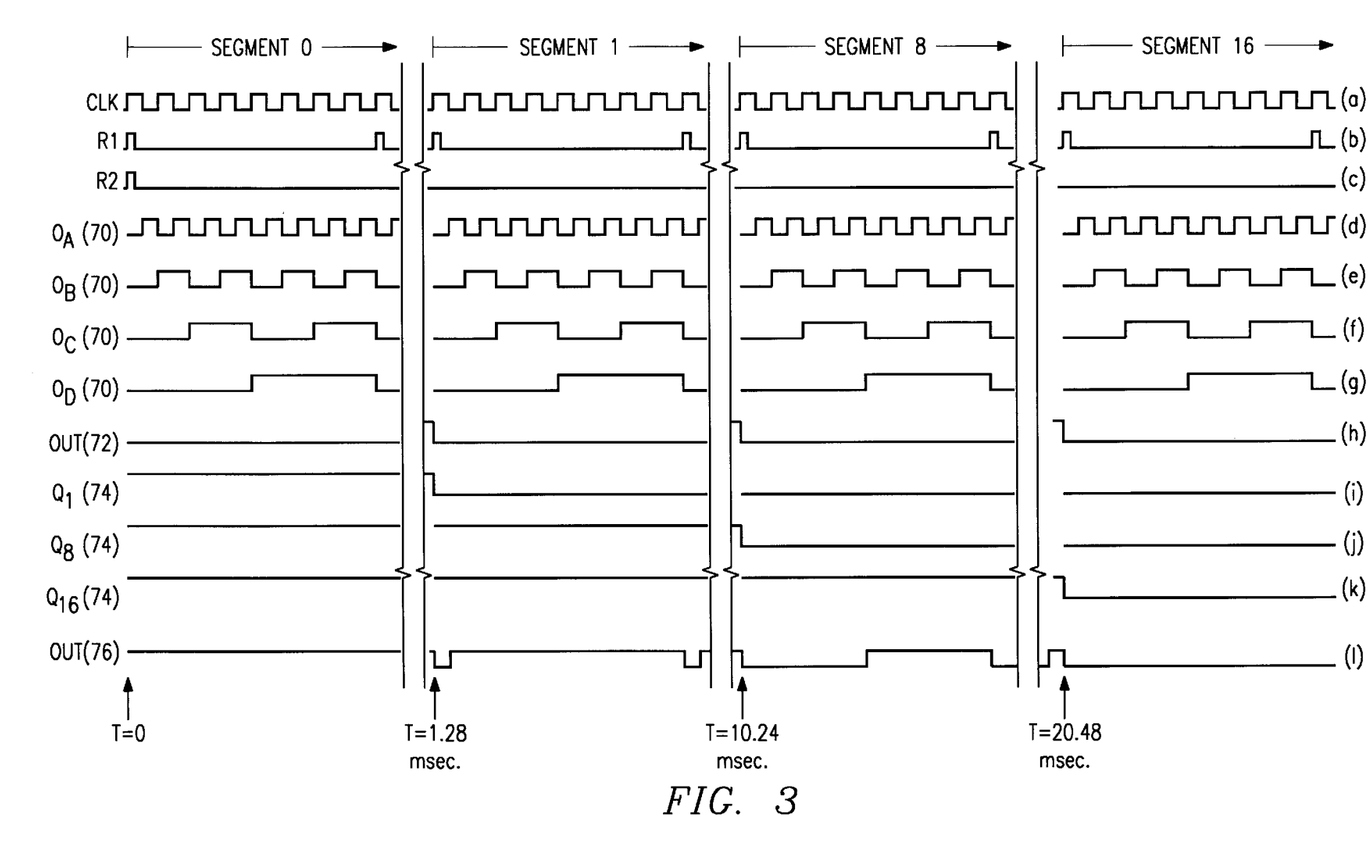
FIG. 3 is a series of timing diagrams useful in understanding the turn-on controller of FIG. 2.

Referring now to FIG. 3, there is shown a series of timing diagrams useful in understanding turn-on controller 52 of FIG. 2. FIG. 3 comprises a plurality of waveforms extending over time (the x-axis), within four distinct time segments, wherein the segment number refers to the progression of logic zeroes along the storage devices of shift register 74. The totality of segments shown (and implied) by FIG. 3 comprises the turn-on sequence generated by turn-on controller 52. As will be learned from discussions in the paragraphs that follow, each segment has a duration of 1.28 milliseconds; thus the entire turn-on sequence (comprising seventeen segments) has a duration of 21.76 milliseconds. However, it will also be recognized from the discussion relating to segment 16 that this segment exerts no controlling influence on the power regulator. Therefore, it may be said that the turn-on control sequence comprises only sixteen recognizable turn-on segments (segments 0 through 15), and has an actual duration of 20.48 milliseconds.

Waveform (a) of FIG. 3 illustrates the input clock signal (CLK) to turn-on controller 52 from oscillator 44 (of FIG. 1). Waveform (b) illustrates the reset pulse (RP) generated by one shot circuit 68 from the R1 input from divider 46 (of FIG. 1), and waveform (c) illustrates the power-on reset pulse R2. Waveforms (d), (e), (f) and (g) illustrate, respectively, the four output signals from counter 70, $O_A$, $O_B$, $O_C$ and $O_D$. Waveform (h) illustrates the output signal from divider 72, and waveforms (i), (j) and (k) illustrate the first, eighth and sixteenth outputs from shift register 74, $Q_1$, $Q_8$ and $Q_{16}$. Finally, waveform (1) illustrates the output signal from turn-on controller 52, viz., the signal at the OUT terminal of decoder 76.

Segment 0 of the FIG. 3 timing diagram represents the inception of the turn-on sequence, and is initiated by the R2 pulse. During this segment, all of the storage elements of shift register 74 (waveforms (i), (j) and (k)) are at a logic one level, with the result that the output from decoder 76 (waveform (1)) is a steady high level. Segment 0 ends when divider 72 completes its count, i.e., its output signal (waveform (h)) makes a high-to-low logic level transition, and segment 1 begins.

During segment 1, the first storage element of shift register 74 is at a logic zero level ($Q_1$=1), and all of the other storage elements of shift register 74 are at a logic one level, with the result that the output from decoder 76 is at a logic zero level for one sixteenth of the cycle of counter 70 and at a logic one level for the remaining fifteen sixteenths of the cycle. Segment 1 ends when divider 72 completes its count, and segment 2 begins.

The next segment illustrated in FIG. 3 is segment 8 in which storage elements 1–8 of shift register 74 are at a logic zero level ($Q_1, Q_2, \ldots Q_8$=1), and the other storage elements of shift register 74 are at a logic one level, with the result that the output from decoder 76 is at a logic zero level for eight sixteenths of the cycle of counter 70 and at a logic one level for the remaining eight sixteenths of the cycle. Segment 8 ends when divider 72 completes its count, and segment 9 begins.

The final segment illustrated in FIG. 3 is segment 16 in which all of the storage elements of shift register 74 are at a logic zero level, with the result that the output from decoder 76 during this entire segment is a steady low logic level, and therefore cannot be said to exert any controlling influence over the power regulator.

Figure 4:
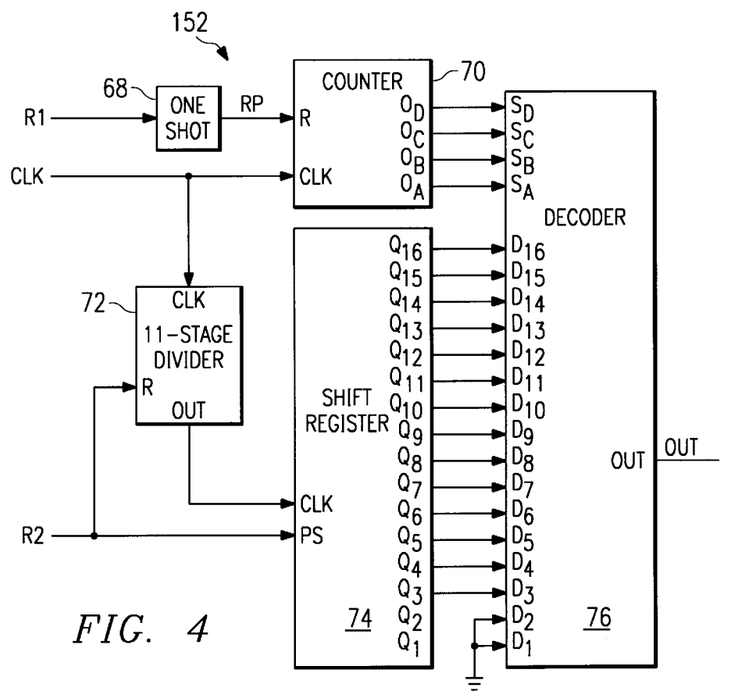
FIG. 4 illustrates a second embodiment of the turn-on controller of the present invention.

Referring now to FIG. 4, there is shown a turn-on controller 152 which may be substituted for turn-on controller 52 of FIG. 1 as an additional embodiment of the present invention. The elements of controller 152 of FIG. 4 are identical to the corresponding elements of controller 52 of FIG. 2 and, as such, have identical numerical designators. The differences between controllers 52 and 152 are found in the interconnection of their respective elements.

As may be understood from the discussion relating to FIG. 3, the early segments of the turn-on process provide very little "on" time for the power regulator of the present invention; indeed, during the 1.28 milliseconds of segment 0, there is no "on" time at all, and during the 1.28 millisecond period of segment 1, the "on" pulses are only 0.625 $\mu$seconds in length every 10 $\mu$seconds. Because these segments are virtually wasted as concerns the start-up of the power regulator, the turn-on controller 152 shown by way of example in FIG. 4 deletes the first and second connections between shift register 74 and decoder 76, and ties the $D_1$ and $D_2$ input terminals of decoder 76 to ground potential (logic zero level), thereby ensuring that during the 2.56 milliseconds of segment 0 and segment 1, there will be "on" pulses which are 1.25 $\mu$seconds in length every 10 $\mu$seconds. Beginning with segment 2, the operation of the start-up process provided by this embodiment will be identical to that provided by the embodiment of FIG. 2. The number of data inputs to be tied off to ground potential is a design choice; two were chosen for this illustration.

Figure 5:
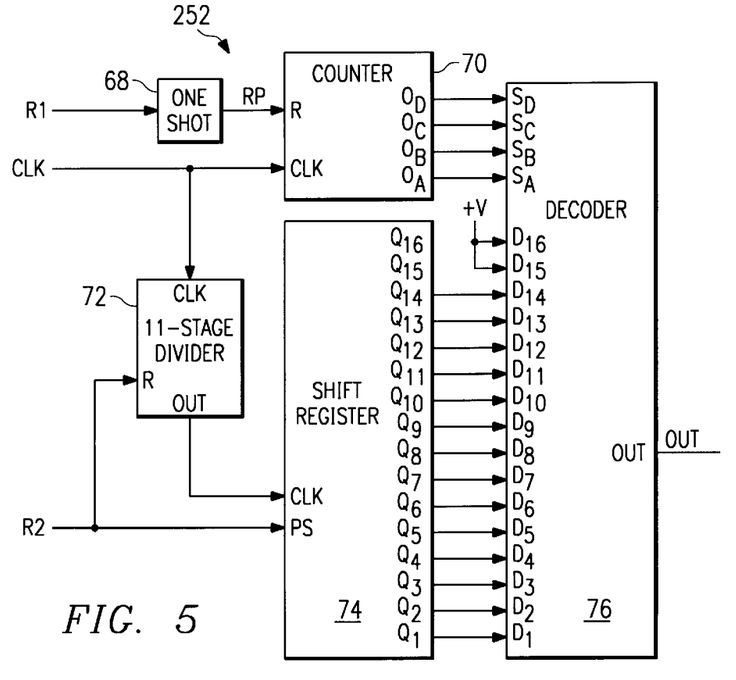
FIG. 5 illustrates a third embodiment of the turn-on controller of the present invention providing means for preventing cycle skipping.

Referring now to FIG. 5, there is shown a turn-on controller 252 which may be substituted for turn-on controller 52 of FIG. 1 as a further embodiment of the present invention. The elements of controller 252 of FIG. 5 are identical to the corresponding elements of controller 52 of FIG. 2 and, as such, have identical numerical designators. The differences between controllers 52 and 252 are found in the interconnection of their respective elements.

The description of the power regulator of FIG. 1 discussed the use of one shot circuit 50 to generate a periodic pulse signal to prevent cycle skipping. Such a cycle skip preventing feature may be incorporated into the turn-on controller of the present invention according to the embodiment of FIG. 5, thereby eliminating the need for one shot circuit 50 and OR gate 56 (of FIG. 1). The turn-on controller 252 shown by way of example in FIG. 5 deletes the fifteenth and sixteenth connections between shift register 74 and decoder 76, and ties the $D_{15}$ and $D_{16}$ input terminals of decoder 76 to logic supply potential (logic one level), thereby causing an "off" period of at least 1.25 $\mu$seconds every 10 $\mu$seconds. The number of data inputs to be tied off to the logic supply potential is a design choice; two were chosen for this illustration to be commensurate with the preferred duty cycle of one-eighth for the cycle skip preventing feature described in relation to one shot circuit 50 of FIG. 1.

It will be recognized by one of skill in the art that the performance features which the embodiments of FIGS. 4 and 5 provide to the turn-on controller 52 of FIG. 2 may be combined into a single device, thus providing the more rapid turn-on characteristics of the embodiment of FIG. 4 and the cycle skip preventing feature of the embodiment of FIG. 5.

Figure 6:
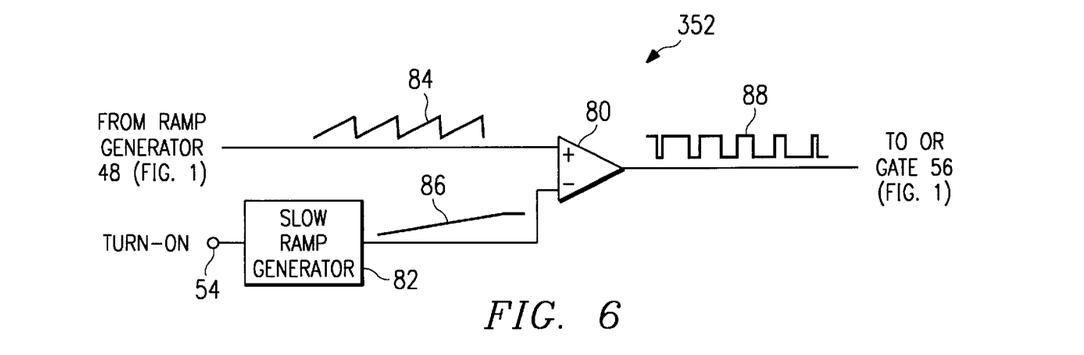
FIG. 6 illustrates a fourth embodiment of the turn-on controller of the present invention.

Referring now to FIG. 6, there is shown a turn-on controller 352 which may be substituted for turn-on controller 52 of FIG. 1 as a still further embodiment of the present invention. In this embodiment, an analog timer is incorporated as part of the turn-on circuitry. This is synchronized to the turn-on, and as each new cycle occurs the output pulse increases in width. This pulse is used to enable the output of the switch-mode power regulator, which limits the on-time of the power regulator during start-up, and limits the current rise in the inductor, while allowing a smooth rise in voltage to the operating point.

More particularly, the embodiment of FIG. 6 includes a comparator which is responsive to a first periodic ramp signal 84 applied at its (+) input node. This first ramp signal 84 may illustratively comprise the signal generated by ramp generator 48 (of FIG. 1). The (−) input node of comparator 80 is coupled to a ramp generator circuit 82. Ramp generator 82 is responsive to the power regulator turn-on signal at input terminal 54 for generating a single, very slow ramp signal 86, illustratively 20 milliseconds in duration.

Comparator 80 processes these two ramp input signals 84,86 to produce an output signal 88. Prior to the initiation of power turn-on, signal 88 is at a steady high logic level. Once ramp signal 86 is initiated, comparator 80 generates a sequence of very short negative-going pulses which increase steadily in width until, at the end of the ramp, signal 88 is at a steady low logic level.

Although turn-on controller 352 as shown in FIG. 6 embodies the principles of the present invention, it is considered less advantageous than the digital implementations of turn-on controllers 52, 152 and 252, of FIGS. 2, 4 and 5, respectively, in that it requires a relatively large capacitor (not shown) as part of the slow ramp generator 82, and thus cannot be easily implemented entirely within an integrated circuit.

The turn-on controller of the present invention offers significant benefits over prior art current limiting devices. Use of digital circuitry provides the advantage of requiring significantly reduced area on an integrated circuit die, typically in the order of only sixty percent of the area required by a similar analog device. Second, the digital elements of the turn-on controller of the present invention, i.e., dividers, counter, shift register and decoder, offer increased configuration flexibility. These devices can be readily configured to optimize turn-on speed for a specific combination of inductor and capacitor combination, while maintaining appropriate limitations on the maximum current through the inductor during turn-on.

While the principles of the present invention have been demonstrated with particular regard to the structure disclosed herein, it will be recognized that various departures may be undertaken in the practice of the invention. As an example, while the apparatus of the present invention is shown as embodied in a buck-type switch-mode power regulator, it is deemed to be within the ability of one of ordinary skill in the art to apply the principles taught herein to other types of switch-mode power regulators. The scope of the invention is therefore not intended to be limited to the particular structure disclosed herein, but should instead be gauged by the breadth of the claims which follow.

What is claimed is:

1. Apparatus for use in a power regulator, said apparatus providing a controlled turn on of said power regulator, said apparatus comprising:

means responsive to an initiation of turn on of said power regulator for generating a signal comprising a sequence of a predetermined number of pulses, said pulses increasing in length monotonically during said sequence; and means responsive to said signal for enabling current flow through said power regulator for the durations of each of said pulses;

wherein said signal is at a first voltage level prior to said initiation of turn on, said signal is pulsed between said first voltage and a second voltage level during said sequence, and said signal continues to pulse between said first voltage and said second voltage level following said sequence, the waveform of said signal following said sequence characterized by relatively short durations at said first voltage level and relatively long durations at said second voltage level.

2. Apparatus for use in a power regulator, said apparatus providing a controlled turn on of said power regulator, said apparatus comprising:

means responsive to an initiation of turn on of said power regulator for generating a signal comprising a sequence of a predetermined number of pulses, said pulses increasing in length monotonically during said sequence; and means responsive to said signal for enabling current flow through said power regulator for the durations of each of said pulses;

wherein said means for generating a signal comprising a sequence of pulses includes:

means for generating a first clocking signal;

means for generating a second clocking signal having frequency less than said first clocking signal;

a shift register having a plurality of stages, each of said stages having an output terminal, the voltage at each of said shift register output terminals being preset to a first level in response to said initiation of turn on of said power regulator, said shift register configured to propagate a second voltage level signal therethrough on successive occurrences of said second clocking signal;

a binary counter responsive to said first clocking signal for providing binary-coded output signals representative of the count of said counter; and a decoder having data input terminals coupled individually to said shift register output terminals, and having select input terminals coupled individually to said counter output signals, said decoder having an output terminal, wherein the voltage level at a selected one of said decoder data input terminals is applied to said decoder output terminal in accordance with the voltage levels at said select input terminals, said decoder providing at said decoder output terminal said signal comprising a sequence of pulses.

3. The apparatus in accordance with claim 2 wherein said means for generating said second clocking signal comprises a divider circuit coupled at its input terminal to said first clocking signal.

4. The apparatus in accordance with claim 2 wherein at least one of said data input terminals of said decoder is fixed to said first voltage level.

5. The apparatus in accordance with claim 2 wherein at least one of said data input terminals of said decoder is fixed to said second voltage level.

6. A switch-mode power regulator having an input terminal for receiving current from a source and having an output terminal, said power regulator responsive to the voltage at said output terminal for controlling the current at said input terminal, said power regulator including apparatus for providing a controlled turn on of said power regulator, said apparatus comprising:

means responsive to an initiation of current from said source for generating a signal comprising a sequence of a predetermined number of pulses, said pulses increasing in length monotonically during said sequence; and means responsive to said signal for enabling current at said input terminal for the durations of each of said pulses;

wherein said signal is at a first voltage level prior to said initiation of turn on, said signal is pulsed between said first voltage and a second voltage level during said sequence, and said signal continues to pulse between said first voltage and said second voltage level following said sequence, the waveform of said signal following said sequence characterized by relatively short durations at said first voltage level and relatively long durations at said second voltage level.

7. A switch-mode power regulator having an input terminal for receiving current from a source and having an output terminal, said power regulator responsive to the voltage at said output terminal for controlling the current at said input terminal, said power regulator including apparatus for providing a controlled turn on of said power regulator, said apparatus comprising:

means responsive to an initiation of current from said source for generating a signal comprising a sequence of a predetermined number of pulses, said pulses increasing in length monotonically during said sequence; and means responsive to said signal for enabling current at said input terminal for the durations of each of said pulses;

wherein said means for generating a signal comprising a sequence of pulses includes:

means for generating a first clocking signal;

means for generating a second clocking signal having frequency less than said first clocking signal;

a shift register having a plurality of stages, each of said stages having an output terminal, the voltage at each of said shift register output terminals being preset to a first level in response to said initiation of turn on of said power regulator, said shift register configured to propagate a second voltage level signal therethrough on successive occurrences of said second clocking signal;

a binary counter responsive to said first clocking signal for providing binary-coded output signals representative of the count of said counter; and a decoder having data input terminals coupled individually to said shift register output terminals, and having select input terminals coupled individually to said counter output signals, said decoder having an output terminal, wherein the voltage level at a selected one of said decoder data input terminals is applied to said decoder output terminal in accordance with the voltage levels at said select input terminals, said decoder providing at said decoder output terminal said signal comprising a sequence of pulses.

8. The apparatus in accordance with claim 7 wherein said means for generating said second clocking signal comprises a divider circuit coupled at its input terminal to said first clocking signal.

9. The apparatus in accordance with claim 7 wherein at least one of said data input terminals of said decoder is fixed to said first voltage level.

10. The apparatus in accordance with claim 7 wherein at least one of said data input terminals of said decoder is fixed to said second voltage level.

11. A switch-mode power regulator comprising:

an input terminal for receiving current from a source;

an output terminal;

means responsive to the voltage at said output terminal for controlling the current at said input terminal;

means responsive to an initiation of current from said source for generating a signal comprising a sequence of a predetermined number of pulses, said pulses increasing in length monotonically during said sequence; and means responsive to said signal for enabling current at said input terminal for the durations of each of said pulses;

wherein said signal is at a first voltage level prior to said initiation of turn on, said signal is pulsed between said first voltage and a second voltage level during said sequence, and said signal continues to pulse between said first voltage and said second voltage level following said sequence, the waveform of said signal following said sequence characterized by relatively short durations at said first voltage level and relatively long durations at said second voltage level.

12. A switch-mode power regulator comprising:

an input terminal for receiving current from a source;

an output terminal;

means responsive to the voltage at said output terminal for controlling the current at said input terminal;

means responsive to an initiation of current from said source for generating a signal comprising a sequence of a predetermined number of pulses, said pulses increasing in length monotonically during said sequence; and means responsive to said signal for enabling current at said input terminal for the durations of each of said pulses;

wherein said means for generating a signal comprising a sequence of pulses includes:

means for generating a first clocking signal;

means for generating a second clocking signal having frequency less than said first clocking signal;

a shift register having a plurality of stages, each of said stages having an output terminal, the voltage at each of said shift register output terminals being preset to a first level in response to said initiation of turn on of said power regulator, said shift register configured to propagate a second voltage level signal therethrough on successive occurrences of said second clocking signal;

a binary counter responsive to said first clocking signal for providing binary-coded output signals representative of the count of said counter; and a decoder having data input terminals coupled individually to said shift register output terminals, and having select input terminals coupled individually to said counter output signals, said decoder having an output terminal, wherein the voltage level at a selected one of said decoder data input terminals is applied to said decoder output terminal in accordance with the voltage levels at said select input terminals, said decoder providing at said decoder output terminal said signal comprising a sequence of pulses.

13. A switch-mode power regulator comprising:

an input terminal for receiving current from a source;

an output terminal;

means responsive to the voltage at said output terminal for controlling the current at said input terminal;

means responsive to an initiation of current from said source for generating a signal comprising a sequence of a predetermined number of pulses, said pulses increasing in length monotonically during said sequence; and means responsive to said signal for enabling current at said input terminal for the durations of each of said pulses;

wherein at least one of said data input terminals of said decoder is fixed to said first voltage level.

14. A switch-mode power regulator comprising:

an input terminal for receiving current from a source;

an output terminal;

means responsive to the voltage at said output terminal for controlling the current at said input terminal;

means responsive to an initiation of current from said source for generating a signal comprising a sequence of a predetermined number of pulses, said pulses increasing in length monotonically during said sequence; and means responsive to said signal for enabling current at said input terminal for the durations of each of said pulses;

wherein at least one of said data input terminals of said decoder is fixed to said second voltage level.

* * * * *